United States Patent
Felix et al.

(10) Patent No.: US 7,696,124 B2
(45) Date of Patent: Apr. 13, 2010

(54) METHOD FOR PRODUCING CATALYTICALLY-ACTIVE MATERIALS

(75) Inventors: Larry Gordon Felix, Pelham, AL (US); David M. Rue, Chicago, IL (US); Rachid B. Slimane, Roselle, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 12/190,808

(22) Filed: Aug. 13, 2008

(65) Prior Publication Data

US 2008/0305948 A1 Dec. 11, 2008

Related U.S. Application Data

(62) Division of application No. 11/075,018, filed on Mar. 8, 2005, now Pat. No. 7,449,424.

(60) Provisional application No. 60/571,379, filed on May 14, 2004.

(51) Int. Cl.
*B01J 37/08* (2006.01)
*B01J 23/00* (2006.01)
*B01J 21/00* (2006.01)
*B01J 21/12* (2006.01)
*C08F 4/58* (2006.01)

(52) U.S. Cl. ............... 502/240; 502/107; 502/300; 502/407; 502/410; 502/439

(58) Field of Classification Search ......... 502/240–243, 502/245, 258, 300, 407, 410, 439, 3, 107; 423/210
See application file for complete search history.

(56) References Cited

U.S. PATENT DOCUMENTS

| | | | |
|---|---|---|---|
| 3,260,587 A | | 7/1966 | Dolf et al. |
| 3,721,632 A | | 3/1973 | Miller et al. |
| 3,738,792 A | | 6/1973 | Feng |
| 3,881,944 A | * | 5/1975 | Beall et al. ............ 501/7 |
| 4,030,903 A | * | 6/1977 | Rittler ............ 65/32.4 |
| 4,045,461 A | | 8/1977 | Kiovsky et al. |
| 4,203,761 A | | 5/1980 | Rose |
| 4,808,562 A | | 2/1989 | Kubersky et al. |
| 4,888,054 A | | 12/1989 | Pond, Sr. |
| 5,518,910 A | | 5/1996 | Parker et al. |
| 5,902,429 A | | 5/1999 | Apte et al. |
| 2003/0170160 A1 | | 9/2003 | Morita et al. |

FOREIGN PATENT DOCUMENTS

WO    WO 01/90687 A1    11/2001

OTHER PUBLICATIONS

Rapagna, S. et al., "Steam Gasification of Biomass in a Fluidized-Bed of Olivine Particles", Biomass and Bioenergy, 19 (2000) 187-197.
Devi, L. et al., "Catalytic Decomposition of Biomass Tars. Olivine as a Prospective Catalyst for Biomass Gasification Processes", Proc. Topical Conf. On Envisioning Biorefineries: Chemicals and Materials from Renewable Feedstocks, AIChE Annual Meeting, Nov. 16-21, 2003.
Courson, C. et al., "Grafted NiO on Natural Olivine for Dry Reforming of Methane", Science and Technology of Advanced Materials, 3 (2002) 271-282.
Takasuga, Takumi et al., "Formation of dioxins (PCDDs/PCDFs) by dioxin-free fly ash as a catalyst and relation with several chlorine-sources", Chemosphere 40 (2000) pp. 1003-1007.

* cited by examiner

*Primary Examiner*—Ngoc-Yen M Nguyen
*Assistant Examiner*—Diana J Liao
(74) *Attorney, Agent, or Firm*—Mark E. Fejer

(57) ABSTRACT

A method for producing a catalytically-active material having at least one base component and at least one catalytically-active component in which the at least one base component is heated to a softening or melting temperature to form a softened or molten base component. While the base component is in the softened or molten state, at least one catalytically-active component is incorporated into or onto the base component, forming the catalytically-active material. In accordance with one embodiment, a catalyst precursor is introduced into the base component and subsequently transformed to a catalytically-active component.

14 Claims, No Drawings

METHOD FOR PRODUCING CATALYTICALLY-ACTIVE MATERIALS

CROSS-REFERENCE TO RELATED APPLICATION

This application is a divisional application of U.S. patent application Ser. No. 11/075,018 filed 8 Mar. 2005, now U.S. Pat. No. 7,449,424, which claims the benefit of provisional U.S. patent application Ser. No. 60/571,379 filed 14 May 2004.

BACKGROUND OF THE INVENTION

1. Field of the Invention

This invention relates to a general method for creating robust, catalytically-active materials suitable for use in a variety of applications. The catalytically-active materials of this invention are engineered to resist attrition or to exhibit controlled rates of attrition in a variety of host environments. These applications include, but are not limited to, petroleum refining, Fischer-Tropsch syntheses, chemical synthesis and production, including the synthesis and production of pharmaceutical compounds, the production of plastics and foodstuffs, and catalysts that effect a chemical or physical change in combination with complexes of DNA-related molecules or living organisms, such as natural or genetically modified bacteria. This invention further relates to catalysts and catalytically-active materials suitable for use in gasification reactor vessels, in particular fluidized bed gasification reactor vessels, and combustion processes. Finally, this invention relates to a method and apparatus for reducing or eliminating tars, which are typically defined as organic compounds having a molecular weight equal to or greater than 78, for example, benzene, and other undesirable volatile compounds produced during the gasification of various feedstocks including coal, biomass and waste materials and the combustion of various fuels.

2. Description of Related Art

In general terms, gasification is a process whereby solid carbonaceous materials such as coal and biomass are converted into cleaner-burning gaseous fuels. Gasification is frequently carried out in a fluidized bed reactor, a reactor chamber comprising a fluidized bed support disposed within the reactor chamber and a fluidized bed material disposed on the fluidized bed support, which fluidized bed material comprises an inert component that is either fully inert or has low catalytic activity, and a catalytically-active component that is dispersed within or upon the inert component. During the gasification process, numerous by-products, including tars and other volatile materials, are also generated. Environmental regulations require that these by-products be treated or otherwise disposed of in an environmentally acceptable manner.

Catalysts are recognized as being essential for reducing or eliminating the tars that accompany the gasification of solid materials. Robust, efficient catalysts that are added to or comprise the bed material of fluidized bed gasifiers represent a significant development because they reduce the overall gasifier footprint by virtue of their incorporation into the gasifier, offer the possibility of substantially eliminating tar formation, and retain their activity in a harsh, chemically active environment. However, the development of in-bed catalysts has been slow because, to date, mineral geology has been relied upon for selection of the best materials for catalyst development. Thus, the ability to move away from earth mineralogy as the basis for identifying and selecting suitable materials is a highly desirable objective, opening the door to the development of new catalyst formations from present waste materials, such as arc furnace dust, mold sands, various slags and mill scale.

Catalytically-active materials employed for reducing or eliminating tars that are produced in the gasification of coal, biomass, or other materials, as well as for other applications, typically comprise two fundamental components, a catalytically-active component and a base or substrate component for support of the catalytically-active component. The base or substrate component is a material substantially physically and chemically inert to the environment in which it is to be used and is typically either a solid monolithic structure wherein the catalytically-active component is deposited onto the surface of the structure or a porous structure wherein the catalytically-active component is disposed on the surface of the structure and in the pores of the structure.

At the present time, most catalysts are prepared by depositing thin layers of catalytically-active materials onto rigid, attrition-resistant substrates or by coating rigid, refractory monoliths (typically used in a self-supporting off-bed tar-cracker or specialized support structure for chemical synthesis). Typical substrates include α-alumina and zirconia. The method of applying a catalytically-active layer onto an inert support varies, but generally two approaches are employed. The most common method, the incipient wetness or wet impregnation method, is typically accomplished by immersion of the substrate in an aqueous solution of a catalyst precursor (typically a metallic salt), resulting in a coated substrate, followed by heating of the coated substrate to convert the catalyst precursor to a catalytically-active material, typically a metallic oxide. If the substrate is porous, a so-called three-dimensional or 3-D catalyst is created. If the surface is not porous, a two-dimensional or 2-D catalyst is created.

Another recently developed method for preparing catalysts uses thermal plasma chemical vapor deposition or TPCVD. This method is primarily used to produce monolithic two-dimensional catalysts and involves spraying a concentrated solution of a metallic salt through a plasma torch onto a suitable refractory substrate. Thus, the end product is a catalyst comprising an inert, rigid substrate with a thin, catalytically-active outer layer. If the outer layer is damaged through attrition or fragmentation, overall catalytic activity is reduced. However, the advantage of this approach is that relatively large amounts of high surface area catalysts that incorporate precious metals can be produced with minimal amounts of these materials.

Two routes are generally available for employing catalysts to reduce or eliminate tars that are produced during the gasification of coal, biomass, or other materials. The first route is through the use of catalysts as described above disposed on the surface of otherwise inert monolithic substrates, which are disposed downstream of the gasification reactor vessel so that the gasification product gases are exposed to the catalysts. Typical of such catalysts are oxides of nickel, cerium, ruthenium, and lanthanum. Catalytic materials have also been embedded into ceramic candle filters so that during high temperature gas particle separation, intimate gas-catalyst contact is assured.

The second route is through the direct introduction of suitably small fragments or beads of catalytic materials into the bed of a fluidized-bed gasifier. These catalytically-active materials are either prepared by depositing a catalyst onto an inert, abrasion-resistant substrate, either monolithic or porous, or are available as naturally-occurring minerals that exhibit catalytic activity. Dolomite and olivine are examples of this type of naturally occurring material. When properly sized fragments of dolomite or olivine are added to the bed of a fluidized bed gasifier, they become intimately involved in the gasification process, achieve good contact with raw fuel gases and inhibit tar formation by cracking or reforming the tars as they are produced to generate lower molecular weight hydrocarbons and carbon. However, a long recognized problem with dolomite is that within the bed of a gasifier, dolomite is rapidly calcined. Calcined dolomite is friable and, thus, tends to be quickly milled within the bed until its particle size becomes too small to be retained within the reactor vessel. This creates the need to replace the attrited catalyst and produces undesirable waste particulate material, aside from ash, that must be separated from the fuel gas. Thus, there is a need for durable catalytic materials that can withstand fluidized bed temperatures and resist fragmentation or, at a minimum, abrade at a slow, predictable rate so that fresh catalyst remains available.

As previously stated, in addition to dolomite, olivine is a naturally occurring catalytic material suitable for reducing tars in fuel gas. Olivine, which is a very hard, attrition-resistant, glassy material which has a very high melting point (1760° C.) and which exhibits catalytic activity for tar removal with extended heat treatment in air at about 900° C., is actually a mixture of two minerals—Fe-rich fayalite ($Fe_2SiO_4$) and Mg-rich forsterite ($Mg_2SiO_4$). Untreated, naturally occurring olivine exhibits less activity for tar removal than dolomite. However, it has been found that heating olivine for extended periods in air at about 900° C. appears to provide sufficient mobility to iron within the olivine so that it becomes enriched at the olivine-air interface. Free iron at the olivine-air interface is then transformed into an oxide by reacting with oxygen in the air and olivine that has been prepared in this manner has been found to exhibit enhanced catalytic activity for reducing tars in biomass-derived fuel gas. In addition, the catalytic activity of olivine is further enhanced by calcining at 1100° C. olivine that has been treated with an aqueous solution of $Ni(NO_3)_2 \cdot 6H_2O$ to a level of about 2.8 weight percent nickel content when dry. By virtue of this treatment, a very active olivine-based catalyst is produced that contains abundant quantities of NiO on the surface of finely divided olivine that has been sized to be in the range of about 250 µm to about 600 µm. Calcining at either higher or lower temperatures appears either to drive the NiO into the olivine or restrict adhesion of NiO to the surface of the olivine. This method of preparing a NiO-based catalyst on an olivine support is taught, for example, by International Patent Publication No. WO 01/89687 A1.

SUMMARY OF THE INVENTION

It is, thus, one object of this invention to provide a catalytically-active material suitable for use in harsh environments such as those found in gasification reactor vessels and combustion systems.

It is another object of this invention to provide a catalytically-active material that is attrition-resistant.

It is a further object of this invention to provide a method for producing a catalytically-active material suitable for use in the harsh environments of gasification reactor vessels and combustion systems.

It is yet a further object of this invention to provide a catalytically-active material for reducing or eliminating tars and other volatile compounds as they are generated in gasification and combustion processes.

It is still another object of this invention to provide a method and apparatus for in-situ reduction or elimination of tars and other volatile compounds generated in gasification and combustion processes.

These and other objects of this invention are addressed by a method for producing a catalytically-active material having at least one base component, which base component is substantially chemically and/or physically inert to the environment of intended use of the catalytically-active material, and at least one catalytically-active component, in which the at least one base component is heated to a softening temperature or melting temperature and the at least one catalytically-active component or at least one catalyst precursor component is incorporated into the softened or molten base component, thereby forming a catalytically-active softened or molten material or a catalyst precursor softened or molten material. In accordance with the embodiment in which the catalytically-active component is incorporated into the softened or molten base component, the resulting catalytically-active softened or molten material is then solidified, typically by cooling, resulting in the desired catalytically-active material. One of the significant benefits of producing a catalytically-active material in accordance with this embodiment of the method of this invention is the ability to use catalytically-active material directly in contrast to conventional methods for producing catalysts in which a substrate or base component is coated with a catalyst precursor and then heated to convert the catalyst precursor to a catalytically-active material. In accordance with the embodiment in which the catalyst precursor is incorporated into the softened or molten base component, the catalyst precursor is chemically reacted, e.g. with oxygen, to form a catalytically-active material. The chemical reaction, which is carried out by exposing the catalyst precursor component to an environment that facilitates the chemical transformation, may occur before, during or after the catalyst precursor softened or molten material is solidified.

DETAILED DESCRIPTION OF PRESENTLY PREFERRED EMBODIMENTS

The invention claimed herein is a method for producing catalysts or catalytically-active materials comprising a substantially inert component, or base component, and a catalytically-active component, in which the catalytically-active component is directly incorporated into the base component or in which a catalyst precursor material is incorporated into the base component after which the catalyst precursor material is chemically transformed to produce the catalytically-active component. As used herein, the term "catalyst precursor" refers to a material which, upon exposure to a suitable environment, undergoes a chemical transformation to form a catalytically-active component. An example of a catalyst precursor is a metal such as Ni, which, when exposed to oxygen, oxidizes to form the catalytically-active material NiO. As previously indicated, catalyst substrates are typically made from refractory ceramics and catalytic materials are often made from refractory metal oxides. Thus, methods of manufacture which seek to process the substrate and the catalyst into one material must carry out some processing steps at very high temperatures. Although the method of this invention may be used to produce catalysts for use in a variety of applications as mentioned herein above, it is particularly suited for producing catalysts suitable for use in harsh environments such as the environment found in gasification reactor vessels.

In accordance with one embodiment of the method of this invention, a substantially chemically inert, durable, attrition-resistant base component is heated to a softening or melting temperature, producing a softened or molten base component. At least one catalytically-active component is then incorporated into the softened or molten base component and then solidified to produce a catalytically-active material. The solidified catalytically-active material is then processed to put it into a form suitable for use in its intended application.

In accordance with one embodiment of this invention, the substantially chemically inert, durable, attrition-resistant base component is heated to a softening or melting temperature, producing a softened or molten base component, and at least one catalyst precursor is then incorporated into the softened or molten base component, in which it undergoes a chemical transformation to form the desired catalytically-active material. This chemical transformation may take place before, during or after the softened or molten material has been solidified and processed to put it into a form suitable for use in its intended application. Without wishing to be bound by any single mechanism by which the catalyst precursor is transformed into a catalytically-active material, it is believed that the catalyst precursor material is mobile in certain glassy materials or in glass ceramics, constantly migrating through the base component to maintain or refresh the catalytic activity at the surface of the catalytically-active material. When exposed to oxygen at the interface between the surface of the catalytically-active material and the surrounding environment, the catalyst precursor may be transformed to the desired catalytically-active material.

For use in a fluidized bed gasification reactor, the catalytically-active material formed in accordance with the method of this invention is formed into substantially uniform sized shards or spheres. This may be accomplished by any means known to those skilled in the art, such as mechanical grinders and ball mills. In accordance with one particularly preferred embodiment of this invention, the substantially chemically inert, durable, attrition-resistant base component is a glassy, amorphous material. As used herein, the term "glassy" refers to materials having the characteristics of glass, including glass ceramics. These glasses are able to withstand the environment of a fluidized bed gasifier for extended periods of time.

In accordance with one embodiment of this invention, the catalytically-active material is produced in a manner which enables slow attrition within the fluidized bed so that fresh catalyst is available as required. These particles are prepared in a manner which enables them to be added to the material in the fluidized bed gasifier or, if suitable, to be utilized as all of the fluidized bed material in the fluidized bed gasifier. Thus, depending upon the level of catalytic activity desired, the uniformly shaped shards or beads of catalytically-active material can serve either as part of or all of the fluidized bed material.

In accordance with one embodiment of this invention, catalytic precursors distributed throughout the base component become catalytically active upon exposure to the environment within the gasifier.

In accordance with another embodiment of this invention, the base component comprises a glassy material that allows suspended metals or alloys or very small catalytically-active particles or suspended catalyst precursors (metals, semi-conductors, or alloys or compounds of such components) dispersed within the glassy material to migrate to the surface of the catalytically-active material so as to refresh or increase the catalytically-active component present at the surface of the catalytically-active material. In accordance with yet another embodiment of this invention, the catalytically-active material and/or the catalyst precursor material is in the form of foams that can be molded into rigid monoliths or mechanically dispersed or formed into catalytically-active particles of a size appropriate for a particular process. In accordance with still a further embodiment of this invention, the catalytically-active material and/or the catalyst precursor material may be formed into fibers using techniques known to those skilled in the art for producing rock wool or fiberglass. The fibers can be aggregated to form barrier filtration devices that can both filter and catalytically transform compounds present in a liquid or gas carrier medium.

In addition to use as fluidized bed material for in situ reduction or elimination of tars generated by a gasification process, other catalyst formulations may be formed in accordance with the method of this invention, such as catalysts that reduce or bind alkali materials and catalysts that reduce or bind halogen compounds. In addition to fluidized bed applications, catalysts for reducing tars in accordance with this invention may be made into high surface area monoliths, that is, glasses fused to alumina or zirconia monoliths, which are then exposed to fuel gases, i.e. gasification products exiting the gasifier. These materials may also be added as finely divided particles to fuel gas exiting the gasifier so that they are caught on and within a dust cake of a particulate collection device and continuously recycled or refreshed as needed when the particulate collection device is cleaned.

Still further applications of the catalytically-active material of this invention include catalytically-active heat resistant coatings for use at the entrance to high temperature fuel cells and for the entrances, blades or interior surfaces of gas turbines. These materials may also be used as coatings for the insides of pipes, either integrated into refractory linings or applied to the inside surface of the pipes, to minimize deposition of tars and other materials. Materials containing catalysts in accordance with this invention may also be used to treat diesel exhaust, presuming that catalysts to increase carbon utilization (through combustion) and volatile organic compounds (VOC) destruction (through catalysis) could be placed within combustion chambers or in exhaust manifolds.

In accordance with one particularly preferred embodiment of this invention, the substantially inert, base component of the catalytically-active material produced in accordance with the method of this invention is olivine and the catalytically-active component is a metal or metal oxide selected from the group consisting of Al, Ag, Au, Ca, Co, Cr, Cu, Eu, Fe, Gd, Ir, La, Mg, Mn, Ni, Pr, Pt, Ru, Rh, Sn, Zn, and alloys and mixtures thereof. For particulate material to be suitable for use as the inert component of a fluidized bed requires formation of particles having sizes suitable for use in fluidized bed reactors, preferably in the range of about 250 μm to about 600 μm, and distribution of the catalytically-active components within the inert component particles. Conventional glass melters and iron melting processes operate at temperatures below the melting point of olivine and, thus, generally are not suitable for use in the method of this invention. However, any process which produces sufficient temperature to melt "black" glass may be utilized in the method of this invention. Glass melters satisfying this criteria include submerged combustion melters, induction melters, plasma melters, and immersed tube melters. Due to the intimacy of contact between the burner output of a submerged combustion melter and the material being melted, submerged combustion melting is a particularly suitable process for producing softened or molten materials comprising catalytically-active materials and/or catalyst precursor materials in accordance with the method of this invention.

The concept of submerged combustion is not new and burners suitable for use in the melting of high melting temperature materials, such as glass, metals, etc. are also known. See, for example, U.S. Pat. No. 3,260,587 to Dolf et al., which teaches a method and apparatus for submerged combustion melting of glass or similar materials in which a burner having an air cooled casing is inserted into a furnace wall, either the furnace side wall or the furnace floor. The burner is provided with means for mixing fuel gas and air, burning them and discharging the combustion products at high temperature and velocity into the glass. The hot gases agitate the glass, transferring a high percentage of heat to the glass, thereby rapidly melting the glass. U.S. Pat. No. 3,738,792 to Feng describes a burner for use in submerged combustion applications which is able to use liquid fuels. Thus, by virtue of the intimate contact that occurs between the combustion products and the molten glass or other molten materials, submerged combustion melters are able to operate at substantially higher temperatures than conventional melters.

Accordingly, fluidized bed materials suitable for use in in-situ reduction or elimination of tars and other volatiles generated during gasification of coal, biomass and waste materials may be produced by melting olivine or another suitable glassy material in a submerged combustion melter, forming a molten glass, and introducing a material in a form suitable for forming a catalytically-active component, e.g. a finely divided powder of NiO, into the submerged combustion melter, resulting in distribution of the catalytically-active component within the molten material or a catalyst precursor component, e.g. a metal that oxidizes to form a catalytically-active material. Once the catalytically-active material or catalyst precursor material has mixed with the melt, it can then be processed by any suitable glass-forming process and drawn into fibers or formed, as a molten material, into a molded monolithic product, as a solid or foam, as fragments of foam, or as small spheres, flakes, shards, or specially-shaped fragments of catalytically-active material or catalyst precursor material, before or as it is cooled. Alternatively, after refining and subsequent removal of the refined fluidized bed material from the melting operation, the cooled material may be subjected to any of a number of techniques known to those skilled in the art for producing the desired material particle sizes, for example, mechanical fragmentation, fritting, and chemical milling.

In accordance with one embodiment of this invention, the catalytically-active material and/or the catalyst precursor can be added to the melt outside the melter, by any of several means, while the material is still soft or molten, so that it becomes disproportionately embedded or enhanced in the outer layers of the foam, fragments, beads or shards produced. This can be accomplished by adding material during the melting process at a temperature between the so-called working point and the so-called softening point of the melted material. Working points and softening points vary for different glasses, but are usually around 1000° C. and 650° C., respectively. Because olivine melts at about 1760° C., much higher than common glasses, the working and softening points of this material would be higher.

In accordance with one embodiment of this invention, the molten base component, infused with catalytically-active material and/or catalyst precursor material, is solidified by rapid quenching upon removal from the glass melter to form amorphous glasses that may be more amenable to subsequent mechanical or chemical processing than similar material that is more slowly cooled.

In accordance with one embodiment of this invention, the substantially inert base component of the catalytically-active material produced in accordance with the method of this invention is a metal and the catalytically-active component is any catalytically-active refractory metal alloy, oxide, or compound that when added to the molten or softened inert base metal retains its catalytic activity. For a metal to be suitable for use as the inert component of a catalytically-active material requires that it be inert to the process and be amenable to being worked or formed into arbitrary shapes, monoliths, and particles that exhibit catalytic activity. Suitable metals include iron, copper, and aluminum. For a fluidized bed, standard metal forming techniques would be used to produce particles of the catalytically-active material having sizes suitable for use in fluidized bed reactors, preferably in the range of about 250 µm to about 600 µm, and distribution of the catalytically-active components within the inert component particles.

Although this invention has been described primarily in connection with higher softening and melting temperature base components and catalytically-active components suitable for use in relatively high temperature application, there are other catalytically-active materials which may be produced in accordance with the method of this invention, and such materials are deemed to be within the scope of this invention. By way of examples, suitable base components include organic polymers such as RYTON, nylon, rayon, NEXTEL, MYLAR and waxes.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for producing a catalytically-active material having at least one base component and at least one catalytically-active component comprising the steps of:

heating said at least one base component to a softening temperature, said at least one base component comprising a glass ceramic, forming a softened base component;

incorporating said at least one catalytically-active component into said softened base component, forming said catalytically-active material; and solidifying said catalytically-active material.

2. A method in accordance with claim 1, wherein said at least one catalytically-active component comprises at least one of a metal and a metal oxide.

3. A method in accordance with claim 2, wherein said metal and said metal oxide comprise a metal selected from the group consisting of Al, Ag, Au, Ca, Co, Cr, Cu, Eu, Fe, Gd, Ir, La, Mg, Mn, Ni, Pr, Pt, Ru, Rh, Sn, Zn, and alloys and mixtures thereof.

4. A method in accordance with claim 1, wherein said at least one catalytically-active component comprises a catalytic material suitable for reducing volatiles generated by at least one of a gasification process and a combustion process.

5. A method in accordance with claim 1, wherein said at least one base component is heated in a submerged combustion melter.

6. A method in accordance with claim 5, wherein said at least one catalytically-active component is incorporated into said at least one base component directly in said submerged combustion melter.

7. A method for producing a catalytically-active material comprising the steps of:

heating at least one base component comprising a glass ceramic to a softening temperature, forming a softened base component;

incorporating at least one catalyst precursor into said softened base component, forming a catalyst precursor material; and transforming said at least one catalyst precursor into a catalytically-active component, forming a catalytically-active material.

8. A method in accordance with claim 7 further comprising solidifying said catalyst precursor material.

9. A method in accordance with claim 7 further comprising solidifying said catalytically-active material.

10. A method in accordance with claim 7 further comprising incorporating at least one catalytically-active component into said softened base component.

11. A method in accordance with claim 7, wherein said at least one catalytically-active component comprises at least one of a metal and a metal oxide.

12. A method in accordance with claim 11, wherein said metal and said metal oxide comprise a metal selected from the group consisting of Al, Ag, Au, Ca, Co, Cr, Cu, Eu, Fe, Gd, Ir, La, Mg, Mn, Ni, Pr, Pt, Ru, Rh, Sn, Zn, and alloys and mixtures thereof.

13. A method in accordance with claim 7, wherein said at least one base component is heated in a submerged combustion melter.

14. A method for producing a catalytically-active glass ceramic comprising the steps of:

heating a glass ceramic to a softening temperature, forming a softened glass ceramic;

incorporating at least one catalytically-active material into said softened glass ceramic, forming a catalytically-active glass ceramic; and solidifying said catalytically-active glass ceramic.

* * * * *